(12) United States Patent
Stoltenberg et al.

(10) Patent No.: US 9,592,475 B2
(45) Date of Patent: Mar. 14, 2017

(54) METHOD FOR FORMING PERFORATED GRAPHENE WITH UNIFORM APERTURE SIZE

(71) Applicant: LOCKHEED MARTIN CORPORATION, Bethesda, MD (US)

(72) Inventors: Randall M. Stoltenberg, Palo Alto, CA (US); Peter V. Bedworth, Los Gatos, CA (US)

(73) Assignee: Lockheed Martin Corporation, Bethesda, MD (US)

(*) Notice: Subject to any disclaimer, the term of this patent is extended or adjusted under 35 U.S.C. 154(b) by 460 days.

(21) Appl. No.: 14/203,655

(22) Filed: Mar. 11, 2014

(65) Prior Publication Data

US 2014/0263035 A1 Sep. 18, 2014

Related U.S. Application Data

(60) Provisional application No. 61/777,099, filed on Mar. 12, 2013.

(51) Int. Cl.
*B01D 39/00* (2006.01)
*B01D 39/14* (2006.01)
*B01D 67/00* (2006.01)
*B01D 71/02* (2006.01)
*B01D 69/02* (2006.01)
(Continued)

(52) U.S. Cl.
CPC ......... *B01D 69/02* (2013.01); *B01D 67/0081* (2013.01); *B01D 69/10* (2013.01); *B01D 71/06* (2013.01); *B01D 2323/283* (2013.01)

(58) Field of Classification Search
CPC ..... B82Y 30/00; B82Y 40/00; Y10S 977/734; B01D 2323/283; B01D 53/228; B01D 71/021; B01D 71/06; B01D 69/02; B01D 67/00; C08G 2650/58
See application file for complete search history.

(56) References Cited

U.S. PATENT DOCUMENTS 8,361,321 B2    1/2013  Stetson et al. ............... 210/652
2010/0105834 A1 4/2010  Tour et al. ..................... 525/50
(Continued)

FOREIGN PATENT DOCUMENTS

WO    WO 2005/047857 A2    5/2005
WO    WO 2011/094204 A2    8/2011    ............ H01B 31/02

OTHER PUBLICATIONS

Graphenomenon, Graphene : Supermaterial, by Cary Huang, pp. 1-3, 2010.*
(Continued)

*Primary Examiner* — Ana Fortuna
(74) *Attorney, Agent, or Firm* — Foley & Lardner LLP

(57) ABSTRACT

A method of forming a filter with uniform pore sizes includes synthesizing a moiety so as to form a plurality of like platelets having a precisely sized pore extending therethrough, distributing the plurality of like platelets about a membrane having apertures therethrough, and bonding the plurality of platelets around the apertures to form precisely sized pores through the membrane. A filtration membrane is also disclosed which provides a porous membrane having a plurality of apertures therethrough, and a plurality of platelets, wherein each platelet has a pore therethrough. The platelets are positioned over or in the apertures.

18 Claims, 1 Drawing Sheet

(51) Int. Cl.
B01D 71/06 (2006.01)
B01D 69/10 (2006.01)

(56) References Cited

U.S. PATENT DOCUMENTS

| 2012/0255899 | A1 | 10/2012 | Choi et al. | 210/489 |
| 2014/0190676 | A1* | 7/2014 | Zhamu | F28F 21/02 165/185 |
| 2016/0043384 | A1* | 2/2016 | Zhamu | H01M 4/133 429/231.4 |

OTHER PUBLICATIONS

Childres et al.; *Effect of oxygen plasma etching on graphene studied using Raman spectroscopy and electronic transport measurements;* New Journal of Physics; Feb. 2011, vol. 13.

Kim et al.; *The structural and electrical evolution of graphene by oxygen plasma-induced disorder;* Nanotechnology IOP Publishing Ltd, UK; vol. 20, No. 37; Sep. 16, 2009.

Zhang et al.; *Method for anisotropic etching of graphite or graphene;* Institute of Physics, Chinese Academy of Sciences; Peop. Rep. China; Mar. 30, 2011.

Bai (Jingwei) et al.; *Graphene nanomesh;* Nature Nanotechnology; Feb. 14, 2010; whole document.

Jiang et al.; *Porous graphene as the ultimate membrane for gas separation;* Nano Letters; Americal Chemical Society, USA; Dec. 9, 2009; vol. 9, No. 12; pp. 4019-4024.

Kim et al.; *Fabrication and Characterisation of Large Area, Semi-conducting Nanoperforated Graphene Materials;* Nano Letters; American Chemical Society; vol. 10, No. 4; Apr. 14, 2010; p. 1125, col. 2, line 25—p. 1126, col. 1, line 11.

Morse; *Scalable Synthesis of Semiconducting Nanopatterned Graphene Materials;* InterNano Resources for Nanomanufacturing; Apr. 30, 2010.

Khun et al.; *From Microporous Regular Frameworks to Mesoporous Materials with Ultrahigh Surface Area: Dynamic reorganization of Porous Polymer Networks;* JACS, 2008; vol. 130; pp. 13333-13337.

Bieri et al.; *Two-dimensional Polymer Formation on Surfaces: Insight into the Roles of Precursor Mobility and Reactivity;* JACS, 2010, vol. 132, pp. 16669-16676.

MacLeod et al; *Supramolecular Ordering in Oligothiophene-Fullerene Monolayers;* JACS, 2009, vol. 131, pp. 16844-16850.

International Search Report mailed Jun. 26, 2014 in corresponding application No. PCT/US2014/023027.

Written Opinion mailed Jun. 26, 2014 in corresponding application No. PCT/US2014/023027.

* cited by examiner

METHOD FOR FORMING PERFORATED GRAPHENE WITH UNIFORM APERTURE SIZE

CROSS REFERENCE TO RELATED APPLICATION

This application claims priority of Provisional application Ser. No. 61/777,099 filed Mar. 12, 2013 and which is incorporated herein by reference.

TECHNICAL FIELD

The present invention is directed to forming atomically thin membranes with apertures therethrough. In particular, the present invention is directed to a method of forming apertures through atomically thin membranes, such as graphene, with uniform size and spacing.

BACKGROUND ART

A graphene membrane is a single-atomic-layer-thick layer of carbon atoms, bound together to define a sheet. The thickness of a single graphene membrane, which may be referred to as a layer or a sheet, is approximately 0.2 to 0.3 nanometers (nm). In some embodiments, multiple graphene layers can be formed, having greater thickness and correspondingly greater strength. Multiple graphene sheets can be provided in multiple layers as the membrane is grown or formed. Or multiple graphene sheets can be achieved by layering or positioning one graphene layer on top of another. For all the embodiments disclosed herein, a single layer of graphene or multiple graphene layers may be used. Testing reveals that multiple layers of graphene maintain their integrity and function as a result of self-adhesion. This improves the strength of the membrane and in some cases flow performance. In most embodiments, the graphene membrane having 2 or more layers is 0.5 to 2 nanometers thick. The carbon atoms of the graphene layer define a repeating pattern of hexagonal ring structures (similar to benzene rings constructed of six carbon atoms), which form a honeycomb lattice of carbon atoms. An interstitial aperture is formed by each hexagonal ring structure in the sheet and this interstitial aperture is less than one nanometer across. Indeed, skilled artisans will appreciate that the interstitial aperture is believed to be about 0.23 nanometers across at its longest dimension. Accordingly, the dimension and configuration of the interstitial aperture and the electron nature of the graphene precludes transport of any molecule across the graphene's thickness unless there are perforations. This dimension is much too small to allow the passage of either water or ions.

Currently, perforated graphene is considered a promising material for achieving molecular filtration. A perforated graphene high-flux throughput material provides significantly improved filtration properties, as opposed to polyimide or other polymeric material filtration materials.

Molecular filtration requires pores to be sized at the molecular level. It is desired for the relevant pore size to range from sub-nanometer (about 0.5 nm) to approximately 20 nanometers in size. However, it has been found to be very difficult to obtain such a size range with conventional tools, especially when trying to obtain perforated graphene over large areas (greater than mm$^2$) needed for filtration. Indeed, for filtration applications, pore size must be tightly controlled to achieve proper rejection of the target species. When using graphene as the filter medium, the density of and the size of the holes in the graphene must be such that the material is not significantly weakened. But neither should the flow through the graphene material be significantly reduced. It has also become apparent that controlling the chemistry of the pores is important, especially in filtration applications where transit through the pores will be affected by the functional groups lining the edge of the pores or apertures.

One method attempted to obtain perforated graphene is referred to as a subtractive method. The subtractive method makes a periodic array of uniform holes in graphene by using a block co-polymer that can be developed to form an etching mask with a periodic array of holes. This is sometimes referred to as a top-down perforation methodology. In such an embodiment, an etch mask of anodic aluminum oxide (AAO) membrane or block copolymer (BCP) film is utilized wherein $O_2$ plasma is directed through the mask so as to etch a sheet of graphene material. Another approach is template-free energy bombardment. This can be done by ion bombardment of highly ordered pyrolitic graphite (HOPG) or with atmospheric plasma. These methods are problematic in that the length scale of the holes and their spacing is on the tens of nanometers (i.e., greater than 20 nm) scale. This precludes use of the material for molecular filtration of small molecules and limits the use of electronics and optics to applications requiring a band gap of approximately 0.1 eV.

Another approach to forming perforated graphene is referred to as a bottom-up solution. This methodology requires surface-assisted condensation of small molecules, such as in Ullman-type synthesis. Assemblies at interfaces utilizing a solvent and HOPG interface have also been attempted, along with cylco-proparene. However, such approaches have not been found to be conducive for manufacturing processes.

Perforated graphene has a number of possible applications including, for example, use as a molecular filter, use as a defined band gap material, and use as an electrically conductive filler material with tunable electrical properties within polymer composites. Although a number of potential uses for perforated graphene exist, as discussed above, there is no reliable way of introducing holes, or pores, to graphene in the size range of about ten nanometers (10 nm) and under, and particularly about five nanometers (5 nm) and under. Multi-step but laborious lithography techniques can be used to fabricate holes greater than about twenty nanometers in size. However, no techniques are presently suitable for fabrication of perforated graphene on the scale of square meters per minute or more.

In summary, the prior art has not been able to provide a methodology for creating uniformly sized and spaced perforations in graphene. Overcoming such a problem can enable a variety of applications in filtration, optics, electronics and structural and thermal materials. Therefore, there is clearly a need in the art for a way to generate a perforated material of the correct pore size and the number of pores in a given area for use in molecular filtration and other applications.

SUMMARY OF THE INVENTION

In light of the foregoing, it is a first aspect of the present invention to provide a method for forming perforated graphene with uniform aperture size.

It is another aspect of the present invention to provide a method of forming a filter with uniform pore sizes, comprising synthesizing a moiety so as to form a plurality of like platelets having a precisely sized pore extending therethrough, distributing the plurality of like platelets about a membrane having apertures therethrough, and bonding the plurality of platelets around the apertures to form precisely sized pores through the membrane.

Yet another aspect of the present invention is to provide a filtration membrane, comprising a porous membrane having a plurality of apertures therethrough, and a plurality of platelets, each platelet having a pore therethrough, wherein the plurality of platelets are positioned over or in the apertures.

BRIEF DESCRIPTION OF THE DRAWINGS

These and other features and advantages of the present invention will become better understood with regard to the following description, appended claims, and accompanying drawings. The drawings are not drawn to scale and proportions of certain parts may be exaggerated for convenience of illustration.

BEST MODE FOR CARRYING OUT THE INVENTION

Figure 1:
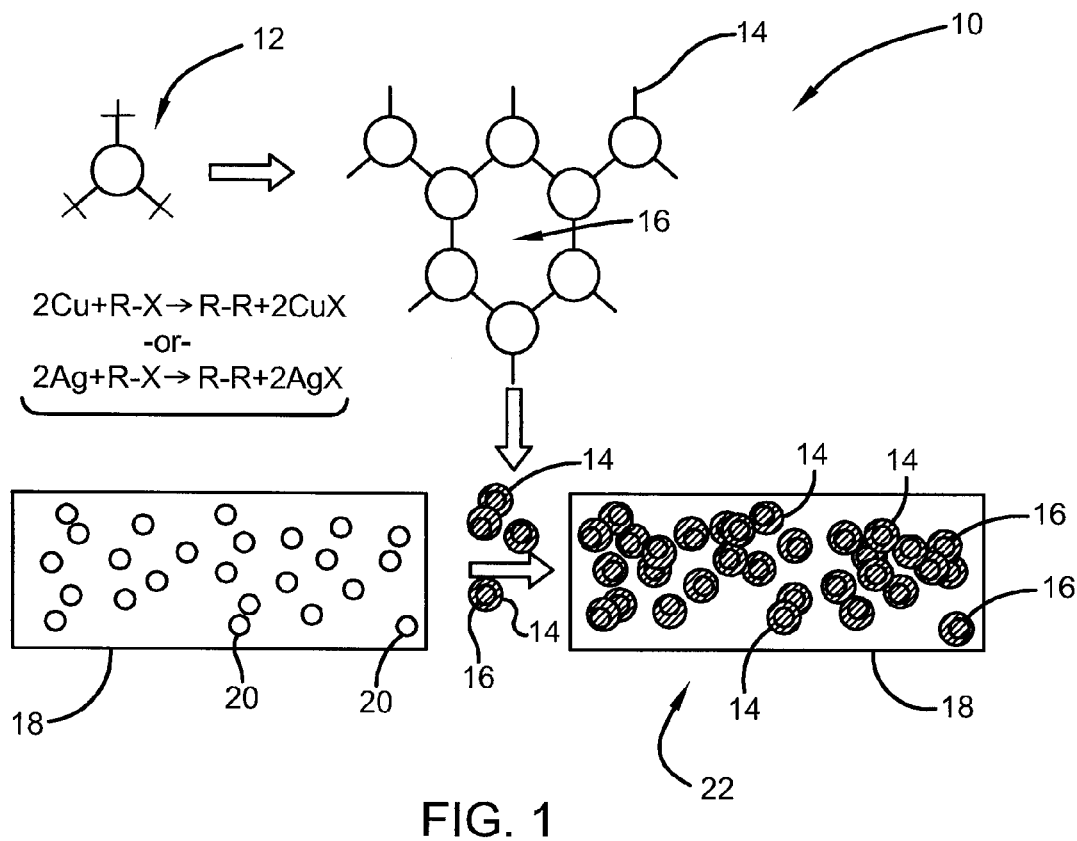
FIG. 1 is a schematic representation of the methodology for forming perforated graphene apertures with a desired pore size and density according to the concepts of the present invention.

Referring now to the drawings, and in particular to FIG. 1, a schematic representation of a methodology for forming perforated atomically thin materials, such as graphene, with uniform aperture or pore size is designated generally by the numeral 10. As seen in FIG. 1, a generally planar, multi-functional salt moiety designated generally by the numeral 12 is utilized. Such a moiety 12 is used as a reactant with either copper or silver in an Ullman-type synthesis based upon, for example, the following chemical equations:

$$2Cu + R\text{—}X \rightarrow R\text{—}R + 2CuX \qquad (1)$$

or

$$2Ag + R\text{—}X \rightarrow R\text{—}R + 2AgX, \qquad (2)$$

where R is the generally planar, multi-functional moiety (described below) and X is a halide such as Cl, Br, or I, or other functional leaving group, such as $CF_3SO_3$, or $CF_3CF_2SO_3$, such that R—X is a salt.

In the present methodology, either of the above equations or similar equations utilizing Ullman-type synthesis can be employed. Indeed, such a synthesis or any similar type synthesis with a surface reaction generates platelets 14 which have a precisely sized pore 16 therethrough. It is believed that these pores formed in the manner disclosed can have a diameter size of less than one nanometer to about 20 nanometers.

As used in the equations above, R is essentially any metal mediated C—C bond formation that is suitably generally planar and functionalized. In one or more embodiments, R is a generally planar core moiety having multiple functional groups, such as X, as noted above, in at least three bonding locations and wherein those bonding locations are spaced about 120° from one another. In other embodiments, there may be four or even six or more functional groups, with spacing at 90° and 60°, respectively. In most embodiments, the monomer R can be any number of organic molecules and may be selected from an aryl group or a combination of aryl groups. In the same or other embodiments, R may be selected from one of the following formulas.

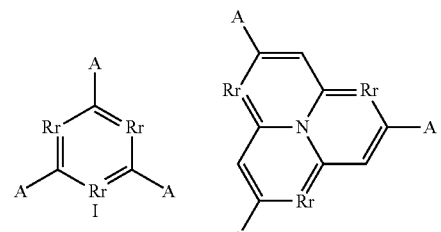

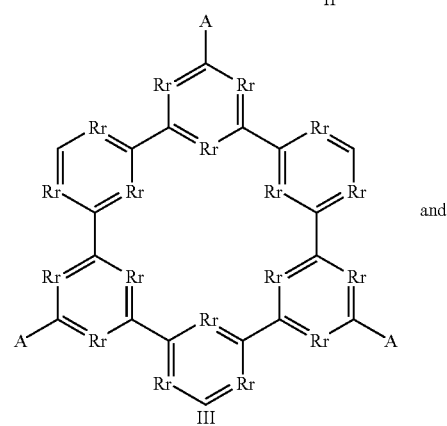

and

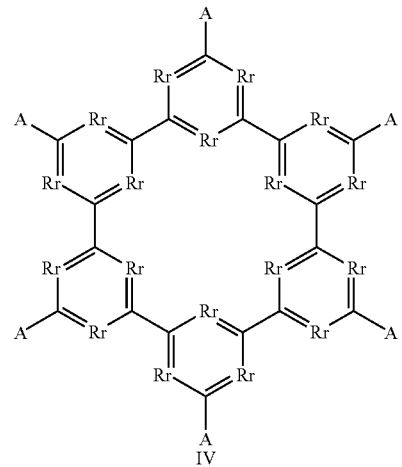

where each A is a point of attachment, i.e., is either the X functional leaving group, another monomer R, where the Ullman-type synthesis is complete, or a spacer group as defined below; and where each Rr is CA, C., CH, N, CCOOR' (where R' is a linear or branched hydrocarbon having up to sixteen carbon atoms) or combinations thereof. In some embodiments, proximal Rr may also be connected via ethylidyl, phenyldiyl and/or naphthdiyl groups.

It will be appreciated that, in one or more embodiments, A may, as one alternative, be a spacer group such that there is an additional moiety spaced between the R's, so as to provide an R-A-R formation. In such embodiments, A may be selected from any one of the following formulas:

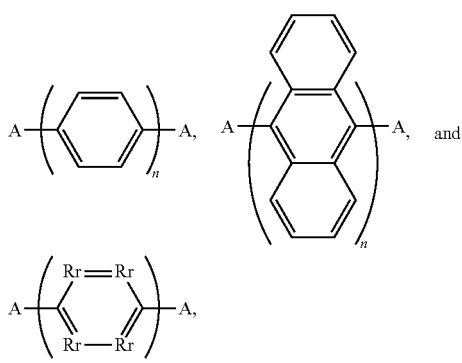

where A is attached to another R (a carbon atom) or X, n is an integer from 1 to 5, and Rr is C., CH, N, CCOOR' (where R' is a linear or branched hydrocarbon having up to sixteen carbon atoms) or combinations thereof, and wherein proximal Rr may be connected via butadiendiyl or xylylidyl groups.

It will be appreciated that, because these molecules may have three or more bonding locations, they remain generally planar when reacted or polymerized. The topology of the moiety is selected so that it can polymerize into a two-dimensional network such as provided by an atomically thin material. And as will be appreciated by skilled artisans, the reaction occurs at the solution-metal interface.

Selection of the moiety R thus controls the dimensional size of the pore 16 extending through the platelet 14. In other words, selection of the moiety or monomer R in turn controls the size of the pore 16. As a result, most any precisely sized hole can be obtained. In some embodiments, the hole or pore size can be less than 1 nm. In other embodiments the pore size can be between 0.5 nm and 1.0 nm. Some embodiments provide a hole size of less than 5 nm. And in other embodiments, the pore sizes can be within any number of selected sub-ranges between 0.5 nm and 20 nm. In essence, the platelet 14 is an ordered array of carbon atoms such as for example an aryl ring or combination of aryl rings, which has an outer diameter in the range of 1 to 20 microns. Upon formation of the platelets, the other components of the synthesis process, namely the halide such as iodine, and metal such as copper or silver are discarded.

The platelets 14 are then utilized in combination with a porous membrane 18. The primary application is to place the platelets 14 directly onto the porous membrane. The membrane 18 has a plurality of apertures 20 which may be sized randomly with diameters of two nanometers or more. In most embodiments the apertures 20 are in the range of 50 nm-5 μm (5000 nm) for polymeric membranes. In the embodiments shown, the apertures have a diameter of about 1 μm (1000 nm). Skilled artisans will appreciate that these apertures are made utilizing techniques known to those skilled in the art. Depending upon the end application or other factors, the platelets 14 are poured onto, into or otherwise distributed about a surface of the membrane 18. Exemplary membranes can be such materials as polycarbonate, polyimide, or others. The platelets 14 cover the apertures 20 so as to provide the precisely sized pores 16 on the membrane 18. As a result, the precise desired nano-scale porosity membrane with desirable strength properties and desirable filtering properties can be obtained.

In relative terms, it is beneficial for the membrane to be "smooth." In other words, it is desirable for the membrane and the areas of the membrane around the apertures to have a relatively flat topography so as to receive and properly position the platelets and their corresponding pore 16. As a result, the outer periphery of the platelets 14 effectively seals the apertures 20. In the present embodiment, it is believed that Van der Waals forces bond the platelets 14 to the membrane 18. In other embodiments, it is believed that the outer periphery of the platelets 14 can be chemically functionalized to assist in bonding the platelets to the membrane surface.

In some embodiments, one method of assembling the platelets to the membrane is to prepare a dilute solution of platelets—platelets mixed with a solvent. The solvent is selected so that the platelets are "open" or "relax" so as to present themselves in a substantially two-dimensional configuration. The solution is then forced, by pressure or otherwise, through the membrane. As a result, the platelets effectively clog the apertures 20. As such, although the platelets are schematically represented as being positioned on a surface of the membrane for some embodiments, in some embodiments the platelets may also position themselves into or within the receiving aperture itself. The solvent then proceeds through the apertures 20 and/or the pores 16 or otherwise evaporates.

In the embodiment described above, a single layer configuration is provided. However, repeated pouring of the above-described solution will result in multiple platelets 14 associated with a single aperture 18. In other words, the platelets will form a loose lamellar structure with channels parallel to the plates and nano-size pore 16 therethrough. In either single layer platelet or multi-layer platelets, the platelets 14 are supported by the membrane 18 in the apertures 20 so as to form a filter 22.

In summary, the molecules or compound 14 controls the pore size and density of holes while their polymerization yields a sufficient large area (>1 um$^2$) for use in molecular filtration applications. In one embodiment a filter 22 can be formed by polymerization at an interface between the platelet and the membrane by utilizing a liquid-liquid polymerization, a liquid-gas polymerization, a solid-gas polymerization, or a solid-liquid polymerization. Moreover, polymerization in solution as described above can provide for a three-dimensional methodology so as to form a three-dimensional monolith with a pore diameter distribution controlled by the dimensions and chemistry of the precursor small-molecule platelet 14.

Figure 2:
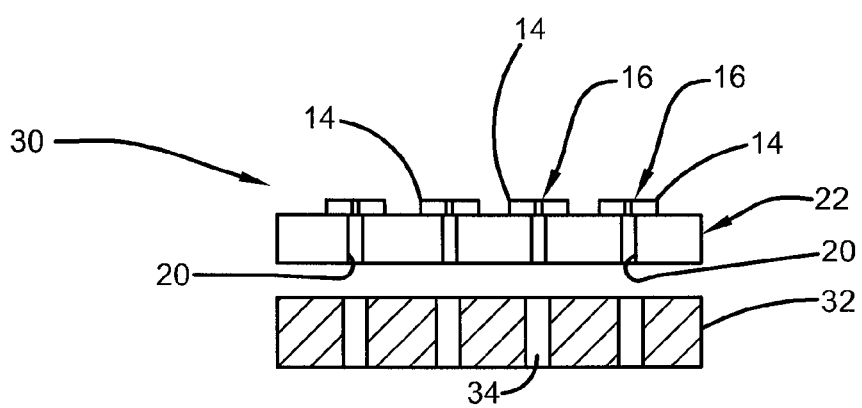
FIG. 2 is a schematic drawing of a filtration membrane utilizing graphene platelets with uniform pore sizes made in accordance with the concepts of the present invention.

Referring now to FIG. 2, which is an enlarged not-to-scale schematic diagram, the graphene filter 22 may be utilized in a filtration membrane designated generally by the numeral 30. The filter 22 can be supported by a backing filter 32 which may be a grid-like material having openings 34 that are relatively larger in diameter than the pores 16 provided by the filter 22. As a result, the filter 22 utilized to cover the pores of the backing filter 32 are of a size formed by the processes described above, thereby imparting the filtration capabilities of the filter 22 to the backing filter. Skilled artisans will appreciate that a filter element is not limited to a two-dimensional material—a single perforated graphene filter—but could be, in fact, utilized in a three-dimensional structure of multiple perforated plates or a polymerized monolith as described above.

From the foregoing description, it will be appreciated that there are numerous advantages to the disclosed methodology and resulting graphene filter. In particular, the disclosed method allows for uniform (identically sized) holes which may be sized from 0.5 nanometers to 20 nanometers. The method also allows for uniform spacing within the two-dimensional membrane matrix. Such a methodology enables molecular filters that could ultimately discriminate helium from other molecules and the hole size can be tailored for any size cut-off from 0.5 nanometers to 20 nanometers based on appropriate choice of the starting materials and, in particular, the moiety 12 and resulting platelet 14. As a result, the selected materials allow for filtration of numerous molecular analytes. The same two-dimensional materials have a well-defined band gap between 0 and approximately 6 eV. Indeed, utilization of uniform smaller size holes will allow larger bandgaps, which in turn open up new electronic applications. For comparison, silicon has an intrinsic band-gap of 1.1 eV, and all of the electronics built on silicon platforms depend on this energy band separation for the observed performance. Higher band gaps also allow operation at higher temperatures and correspond to the energies of visible light, enabling photonics applications.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method of forming a membrane with uniform pore sizes, comprising:

reacting a of moieties selected from any one of formula (I), (II), (III), (IV) and mixtures thereof to form a plurality of platelets having a sized pore extending therethrough;

distributing said plurality of platelets about a membrane having apertures therethrough; and bonding said plurality of platelets around or within said apertures to form precisely sized pores through said membrane, wherein the moieties of formula (I), (II), (III), (IV) and mixtures thereof are represented by the following:

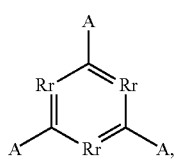
(I)

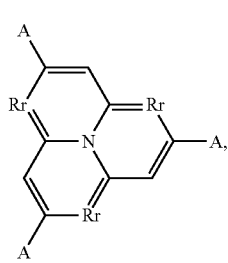
(II)

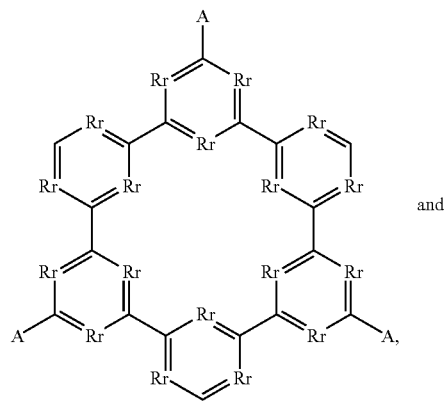
(III)

and

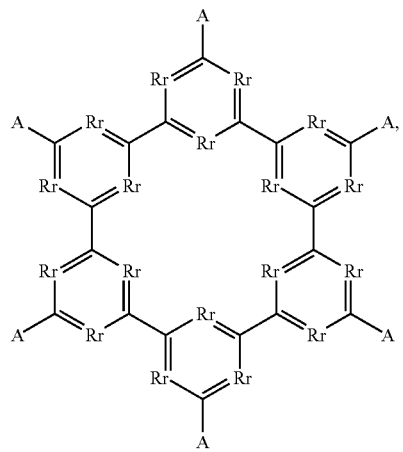
(IV)

wherein each A is a functional leaving group selected from the group consisting of a halide, $CF_3SO_3$, and $CF_3CF_2SO_3$; and wherein each Rr is selected from the group consisting of CA, C., CH, N, and CCOOR', where R' is a linear or branched hydrocarbon having up to sixteen carbon atoms, and wherein the moieties of formula (I), (II), (III), (IV) and mixtures thereof may be optionally connected through one or more linking group selected from anyone of:

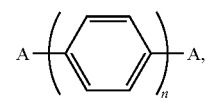

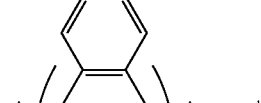
and

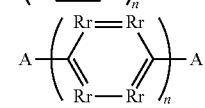

wherein A is attached to another carbon atom of formula (I), (II), (III), (IV), n is an integer from 1 to 5, and Rr is C., CH, N, CCOOR' (where R' is a linear or branched hydrocarbon having up to sixteen carbon atoms) or combinations thereof, and wherein proximal Rr may be connected via butadiendiyl or xylylidyl groups.

2. The method according to claim 1, further comprising: forming said uniform pore sizes with a size of about 0.5 nm to about 20 nm.

3. The method according to claim 1, wherein said membrane having apertures therethrough comprises apertures sized 50 nm to 5000 nm.

4. The method according to claim 1, wherein said membrane having apertures therethrough comprises apertures sized 50 nm to 5000 nm; and said platelets have an outer diameter of 1 to 20 microns.

5. The method according to claim 4 further comprising: sealing said apertures with said outer diameter of said platelets.

6. The method according to claim 1 further comprising: chemically functionalizing an outer periphery of said platelets to assist in bonding said platelets to said membrane.

7. The method of claim 1, wherein reacting a plurality of moieties of formula (I), (II), (III), (IV) and mixtures thereof comprises conducting a coupling reaction in the presence of silver or copper.

8. The method of claim 1, wherein Rr is CH in said moieties of formula (I), (II), (III), (IV) and mixtures thereof.

9. The method of claim 1, wherein the moieties of formula (I), (II), (III), (IV) and mixtures thereof are connected through one or more linking group selected from any one of:

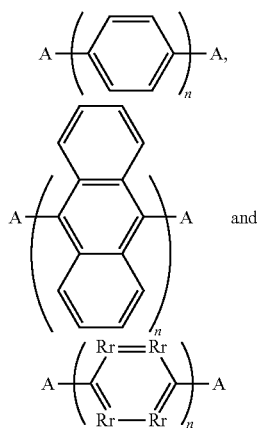

wherein A is attached to another carbon atom of formula (I), (II), (III), (IV), n is an integer from 1 to 5, and Rr is C., CH, N, CCOOR' (where R' is a linear or branched hydrocarbon having up to sixteen carbon atoms) or combinations thereof, and wherein proximal Rr may be connected via butadiendiyl or xylylidyl groups.

10. A membrane, comprising
a porous membrane having a plurality of apertures therethrough; and
a plurality of platelets, each said platelet having a pore therethrough,
wherein said plurality of platelets are positioned over or in said apertures, and
wherein the plurality of platelets comprise platelets comprising coupled moieties selected from any one of the moieties of formula (I), (II), (III), (IV) and mixtures thereof:

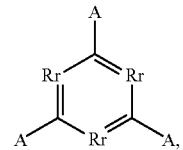

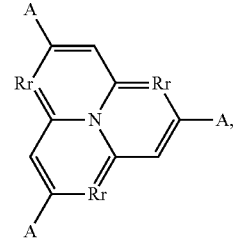

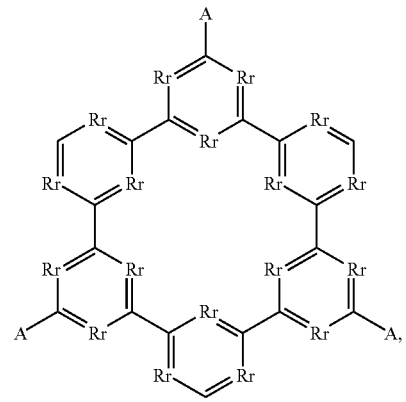

and

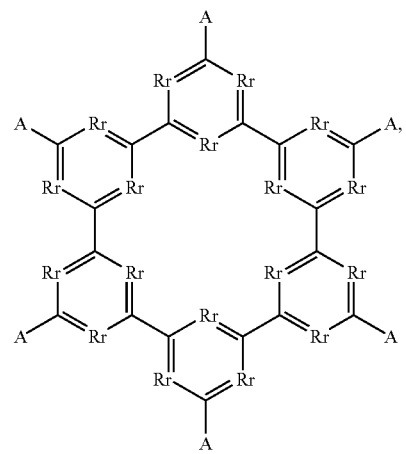

wherein each A is a functional leaving group selected from the group consisting of a halide $CF_3SO_3$, and $CF_3CF_2SO_3$; and
wherein each Rr is selected from the group consisting of CA, C., CH, N, and CCOOR', where R' is a linear or branched hydrocarbon having up to sixteen carbon atoms,
wherein an outer periphery of said platelets may be optionally be chemically functionalized to assist in bonding said platelets to said membrane, and
wherein the moieties of formula (I), (II), (III), (IV) and mixtures thereof may be optionally connected through one or more linking group selected from anyone of:

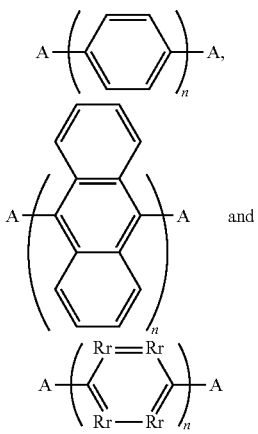

wherein A is attached to another carbon atom of formula (I), (II), (III), (IV), n is an integer from 1 to 5, and Rr is C., CH, N, CCOOR' (where R' is a linear or branched hydrocarbon having up to sixteen carbon atoms) or combinations thereof, and wherein proximal Rr may be connected via butadiendiyl or xylylidyl groups.

11. The membrane according to claim 10, wherein each of the platelets comprising coupled moieties selected from any one of the moieties of formula (I), (II), (III), (IV) and mixtures thereof are produced by an Ullman type reaction product of silver or copper and any one of moieties of formula (I), (II), (III), (IV) and mixtures thereof.

12. The membrane according to claim 9, wherein said moiety has an outer diameter between 1 to 20 microns.

13. The membrane according to claim 9, wherein said moiety has a diameter between 0.5 nm to 20 nm.

14. The membrane according to claim 9, wherein Rr is CH in said moieties of formula (I), (II), (III), (IV) and mixtures thereof.

15. The membrane according to claim 9, wherein said porous membrane has apertures sized between 50 nm to 5000 nm.

16. The membrane according to claim 9, further comprising
a backing filter positioned on a side of said porous membrane opposite a side on which said plurality of platelets are disposed.

17. The membrane according to claim 9, wherein an outer periphery of said platelets bond to said porous membrane.

18. The membrane according to claim 9, wherein the moieties of formula (I), (II), (III), (IV) and mixtures thereof are connected through one or more linking group selected from any one of:

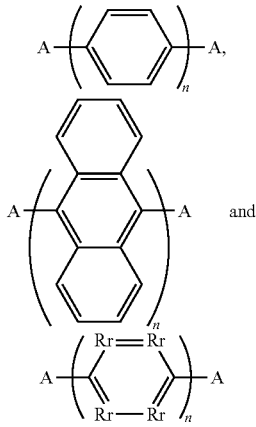

wherein A is attached to another carbon atom of formula (I), (II), (III), (IV), n is an integer from 1 to 5, and Rr is C., CH, N, CCOOR' (where R' is a linear or branched hydrocarbon having up to sixteen carbon atoms) or combinations thereof, and wherein proximal Rr may be connected via butadiendiyl or xylylidyl groups.

* * * * *

UNITED STATES PATENT AND TRADEMARK OFFICE
CERTIFICATE OF CORRECTION

| | | |
|---|---|---|
| PATENT NO. | : 9,592,475 B2 | |
| APPLICATION NO. | : 14/203655 | |
| DATED | : March 14, 2017 | |
| INVENTOR(S) | : Randall M. Stoltenberg and Peter V. Bedworth | |

It is certified that error appears in the above-identified patent and that said Letters Patent is hereby corrected as shown below:

In the Claims

In Claim 1 (Column 7, Line 32):
Should read:
Reacting moieties selected from any one of In Claim 1 (Column 8, Line 1):
Delete:
"-continued"

In Claim 1 (Column 8, Line 46):
Should read:
one or more linking group selected from any one of:

In Claim 10 (Column 10, Line 54):
Should read:
from group consisting of a halide, $CF_3SO_3$, and In Claim 10 (Column 10, Line 67):
Should read:
any one of:

Signed and Sealed this
Sixth Day of June, 2017

Michelle K. Lee
*Director of the United States Patent and Trademark Office*